(12) United States Patent
John et al.

(10) Patent No.: US 10,341,175 B2
(45) Date of Patent: Jul. 2, 2019

(54) OPERATIONS, ADMINISTRATION, AND MANAGEMENT (OAM) FUNCTIONS IN A SOFTWARE DEFINED NETWORK

(71) Applicant: Telefonaktiebolaget LM Ericsson (publ), Stockholm (SE)

(72) Inventors: Wolfgang John, Arsta (SE); Catalin Meirosu, Stockholm (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 42 days.

(21) Appl. No.: 15/588,090

(22) Filed: May 5, 2017

(65) Prior Publication Data

US 2017/0237614 A1     Aug. 17, 2017

Related U.S. Application Data

(62) Division of application No. 14/417,916, filed as application No. PCT/IB2012/053946 on Aug. 1, 2012, now Pat. No. 9,680,698.

(51) Int. Cl.
*H04L 12/24* (2006.01)
*H04L 12/26* (2006.01)

(52) U.S. Cl.
CPC ........ *H04L 41/0806* (2013.01); *H04L 43/026* (2013.01)

(58) Field of Classification Search
CPC ... H04L 41/0806; H04L 43/026; H04L 47/12; Y02B 60/33
USPC ...................................................... 370/236.2
See application file for complete search history.

(56) References Cited

U.S. PATENT DOCUMENTS

| 6,590,895 | B1* | 7/2003 | Gupta .................. H04L 1/1614 370/394 |
| 7,190,896 | B1 | 3/2007 | Wang et al. |
| 9,680,698 | B2 | 6/2017 | John et al. |
| 2002/0067729 | A1 | 6/2002 | Fukuda et al. |
| 2011/0293988 | A1* | 12/2011 | Obernyer ................ H01M 4/20 429/144 |

(Continued)

FOREIGN PATENT DOCUMENTS

CN        1551577 A     12/2004

OTHER PUBLICATIONS

Author Unknown, "Virtual Bridged Local Area Networks—Amendment 5: Connectivity Fault Management," IEEE P802.1ag/D8.1, IEEE, Jun. 18, 2007, 255 pages.

(Continued)

*Primary Examiner* — Stephen J Clawson
(74) *Attorney, Agent, or Firm* — Withrow & Terranova, PLLC

(57) ABSTRACT

Communication of a module to a datapath node is disclosed. A controller node receives connection information identifying a first datapath node in communication with a network. The controller node obtains Operations, Administration, and Management (OAM) information including an OAM action set that identifies one or more OAM actions the first datapath node is capable of implementing at the first datapath node. A first OAM tool module is determined that is operative to perform at least one of the one or more OAM actions identified in the OAM action set to implement a first OAM tool function. The first OAM tool module is communicated to the first datapath node.

21 Claims, 7 Drawing Sheets

(56) References Cited

U.S. PATENT DOCUMENTS

| | | |
|---|---|---|
| 2011/0317559 A1 | 12/2011 | Kern et al. |
| 2012/0082161 A1 | 4/2012 | Leung et al. |
| 2013/0010600 A1* | 1/2013 | Jocha .................. H04L 43/026 370/236.2 |
| 2013/0176850 A1 | 7/2013 | Mishra et al. |
| 2013/0266012 A1 | 10/2013 | Dutta et al. |
| 2014/0169179 A1 | 6/2014 | Ding et al. |

OTHER PUBLICATIONS

Author Unknown, "ITU-T: Telecommunication Standardization Sector of ITU: OAM functions and mechanisms for Ethernet based networks," International Telecommunication Union, G.8013/Y. 1731, Jul. 2011, 92 pages.

Author Unknown, "OpenFlow Management and Configuration Protocol (OF-Config.1.1)," Version 1.1, Open Networking Foundation, Jun. 25, 2012, 117 pages.

Author Unknown, "OpenFlow Switch Specification," Version 1.3.0 (Wire Protocol 0x04), Open Networking Foundation, Jun. 25, 2012, 106 pages.

Author Unknown, "OpenFlow Switch Specification," Version 1.1.0 Implemented (Wire Protocol 0x02), Open Networking Foundation, Feb. 28, 2011, 56 pages.

Bocci, Matthew et al., "MPLS Generic Associated Channel," Network Working Group, Request for Comments: 5586, Category: Standards Track, Jun. 2009, IETF Trust, 19 pages.

Bush, S., et al., "In-Line Network Management Prediction," Network Working Group, Internet-Draft, Jul. 2002, 42 pages.

Busi, Italo et al., "MPLS-TP OAM based on Y.1731: draft-bhh-mpls-tp-oam-y1731-08.txt," MPLS Working Group, Internet Draft, Intended status: Standard Track, Jan. 11, 2012, IETF, 29 pages.

Busi, I., et al. (ed), "Operations, Administration, and Maintenance Framework for MPLS-Based Transport Networks," Internet Engineering Task Force (IETF), Request for Comments: 6371, Sep. 2011, 63 pages.

Foster, Nate, et al., "Frenetic: A Network Programming Language," International Conference on Functional Programming (ICFP) '11, ACM, Tokyo, Japan, Sep. 19-21, 2011, 13 pages.

Frost, Dan et al., "Packet Loss and Delay Measurement for MPLS Networks," Internet Engineering Task Force (IETF), Request for Comments: 6374, Category: Standards Track, Sep. 2011, IETF Trust, 52 pages.

Gude, Natasha, et al., "NOX: Towards an Operating System for Networks," ACM SIGCOMM Computer Communication Review, vol. 38, No. 3, Jul. 2008, 6 pages.

Kempf, James, et al., "Scalable Fault Management for OpenFlow," 2012 IEEE International Conference on Communications (ICC), Ottawa, ON, Jun. 10-15, 2012, 5 pages.

Mattos, D. M. F., et al., "OMNI: OpenFlow MaNagement Infrastructure," Proceedings of the 2011 International Conference on the Network of the Future (NOF), IEEE, Piscataway, NJ, Nov. 28, 2011, pp. 52-56.

McKeown, Nick, et al., "OpenFlow: Enabling Innovation in Campus Networks," ACM SIGCOMM Computer Communication Review, vol. 38, No. 2, Apr. 2008, 6 pages.

Prieto, Alberto Gonzalez, et al., "D-4.3: In-network management design," Objective FP7-ICT-2007-1-216041/D4.3; The Network of the Future; Project 216041, May 26, 2010, 121 pages.

Van Der Pol, Ronald, et al., "OpenFlow Demo: IEEE 802.1ag Ethernet OAM SCInet Research Sandbox," IEEE, Surf Net, http://nrg.sara.nl/dot1ag-utils, Nov. 12-18, 2011, 1 page.

Non-Final Office Action for U.S. Appl. No. 14/417,916, dated Aug. 18, 2016, 19 pages.

Final Office Action for U.S. Appl. No. 14/417,916, dated Nov. 30, 2016, 21 pages.

Notice of Allowance and Examiner-Initiated Interview Summary for U.S. Appl. No. 14/417,916, dated Feb. 7, 2017, 9 pages.

Supplemental Notice of Allowance for U.S. Appl. No. 14/417,916, dated Apr. 26, 2017, 4 pages.

First Office Action and Search Report for Chinese Patent Application No. 201280075034.6, dated Apr. 1, 2017, 21 pages.

International Search Report and Written Opinion for PCT/IB2012/053946, dated Mar. 7, 2013, 13 pages.

International Preliminary Report on Patentability for PCT/IB2012/053946, dated Feb. 12, 2015, 8 pages.

\* cited by examiner

OPERATIONS, ADMINISTRATION, AND MANAGEMENT (OAM) FUNCTIONS IN A SOFTWARE DEFINED NETWORK

RELATED APPLICATION

This application is a divisional of U.S. patent application Ser. No. 14/417,916, entitled "OPERATIONS, ADMINISTRATION, AND MANAGEMENT (OAM) FUNCTIONS IN A SOFTWARE DEFINED NETWORK," now U.S. Pat. No. 9,680,698, which is a 35 U.S.C. § 371 national phase filing of International Application No. PCT/IB2012/053946, filed on Aug. 1, 2012, which is hereby incorporated herein by reference in its entirety.

TECHNICAL FIELD

The present disclosure relates to implementing Operations, Administration, and Management (OAM) functionality in a communications network, and in particular to the implementation of OAM functions in a software defined networking environment.

BACKGROUND

Software defined networking (SDN) is a network architecture where the forwarding plane (sometimes referred to as the data plane) and the control plane, which are conventionally implemented in a single network node, are separated and implemented in two distinct network nodes. Such distinct network nodes may be referred to as a datapath node and a controller node, respectively. An example of an SDN architecture, or specification, is the OpenFlow Switch Specification, version 1.1.0.

Theoretically, by implementing the forwarding function and the control function in different network nodes, multiple relatively inexpensive datapath nodes may be coupled together and controlled by a single controller node, resulting in an overall lower network cost. Another supposed advantage of SDN is that a single controller node can be more easily programmed to implement new network functionality than would be possible by programming multiple conventional network nodes that combine the control plane and the forwarding plane, thereby simplifying the implementation of additional networking functions in the network.

Moving data from source nodes to destination nodes across multiple network nodes involves complex technology, and conventional network nodes implement multiple Operations, Administration, and Management (OAM) functions that permit an operator to resolve problems, monitor the network, and otherwise operate, administer, or manage the network.

Currently, the datapath nodes of a software defined network do not have the intelligence required to implement OAM functions under the control of the controller node. Even if a datapath node is specially programmed to implement an OAM function, doing so runs counter to the notion of SDN, in that the datapath nodes must again become specially programmed on a datapath-node-by-datapath-node basis, which is what SDN desires to avoid.

SUMMARY

The present disclosure relates to the implementation of Operations, Administration, and Management (OAM) functions in a software defined networking (SDN) architecture. A controller node determines which OAM actions a datapath node is capable of implementing, and determines an OAM tool module that is operative to perform one or more of the OAM actions to implement an OAM tool function at the datapath node. The controller node communicates the OAM tool module to the datapath node, and the datapath node may subsequently execute the OAM tool module to implement the OAM tool function under the control of the controller node.

In one embodiment, the controller node receives connection information that identifies the first datapath node in communication with a network. The controller node obtains OAM information that includes an OAM action set that identifies one or more OAM actions the first datapath node is capable of implementing at the first datapath node. The controller node determines a first OAM tool module that is operative to perform at least one of the one or more OAM actions to implement a first OAM tool function. The controller node communicates the first OAM tool module to the first datapath node. Among other advantages, the controller node is capable of communicating OAM tool modules to multiple different types of datapath nodes.

In one embodiment, the controller node identifies a flow in the network, and directs the first datapath node to implement the first OAM tool function in conjunction with the flow. In one embodiment, the flow is identified by the receipt of operator input that identifies the flow from a plurality of flows in the network. In another embodiment, the flow is identified based on a request to establish a new flow in the network.

When directing the first datapath element to implement the first OAM tool function in conjunction with the flow, the controller node may send OAM parameters to the first datapath node that identify the first OAM tool module and the flow. In one embodiment, the OAM parameters identify an OAM packet template that defines the structure of a packet to be created by the first OAM tool function on the first datapath node. The OAM parameters may also define one or more values to be inserted into the packet. The OAM parameters may further identify a node in the network to which information should be sent by the first OAM tool module.

The controller node may also direct a second datapath node to implement a second OAM tool function in conjunction with the flow. The first datapath node may comprise, for example, an ingress datapath node and the second datapath node may comprise, for example, an egress datapath node. The first OAM tool function and the second OAM tool function may collectively implement an OAM function in conjunction with the flow. In one embodiment, the controller node receives, from the second datapath node, a packet generated by the first datapath node, and may process information contained in the packet based on the OAM function.

In one embodiment, the connection information provided by the first datapath node includes the OAM action set that identifies the one or more OAM actions that first datapath element is capable of implementing at the first datapath node. In another embodiment, the controller node, in response to receiving the connection information, sends a communication to the first datapath node requesting an identification of the one or more OAM actions the first datapath node is capable of implementing at the first datapath node.

In one embodiment, the OAM information includes interface information that identifies interfaces on the first datapath node to the one or more OAM actions identified in the OAM action set. The controller node may modify a first OAM tool source code based on the interface information, and process the first OAM tool source code to generate the first OAM tool module.

In one embodiment, a controller node includes a transceiver subsystem that is configured to communicate with a network. The controller node further includes a processing subsystem coupled to the transceiver subsystem, and is configured to receive connection information identifying a first datapath node in communication with the network. The controller node obtains OAM information including an OAM action set that identifies one or more OAM actions the first datapath node is capable of implementing at the first datapath node. The controller node determines a first OAM tool module that is operative to perform at least one of the one or more OAM actions identified in the OAM action set to implement a first OAM tool function, and communicates the first OAM tool module to the first datapath node. As discussed above, among other advantages, the controller node is capable of communicating OAM tool modules to multiple different types of datapath nodes.

In one embodiment, a datapath node communicates, to a controller node, connection information that identifies the datapath node and OAM information including an OAM action set that identifies one or more OAM actions the datapath node is capable of implementing at the datapath node. The datapath node receives an OAM tool module from the controller node for execution on the datapath node that is operative to perform at least one of the one or more OAM actions identified in the OAM action set to implement a first OAM tool function. Among other advantages, the datapath node need not be specially programmed with multiple different OAM tool modules, and can obtain different OAM tool modules from a centralized controller node without any such special programming.

In one embodiment, a datapath node includes a transceiver subsystem configured to communicate with a network and a processing subsystem coupled to the transceiver subsystem. The processing subsystem is configured to communicate, to a controller node, connection information identifying the datapath node and OAM information including an OAM action set that identifies one or more OAM actions the datapath node is capable of implementing at the datapath node. The processing subsystem is further configured to receive an OAM tool module from the controller node for execution on the datapath node that is operative to perform at least one of the one or more OAM actions identified in the OAM action set to implement a first OAM tool function. In practice, among other advantages, different types of datapath nodes may be relatively easily connected to the network and run-time loaded with pertinent OAM tool modules without a need to specially program each datapath node in accordance with a manufacturer's proprietary protocols.

In one embodiment, a system includes a controller node that includes a first transceiver subsystem configured to communicate with a network and a first processing subsystem coupled to the first transceiver subsystem. The first processing subsystem is configured to receive, from a first datapath node, connection information identifying the first datapath node, and to obtain OAM information including an OAM action set that identifies one or more OAM actions the first datapath node is capable of implementing at the first datapath node. The first processing subsystem is further configured to determine a first OAM tool module that is operative to perform at least one of the one or more OAM actions identified in the OAM action set to implement a first OAM tool function, in order to communicate the first OAM tool module to the first datapath node.

The system further includes the first datapath node, which includes a second transceiver subsystem configured to communicate with the network, and a second processing subsystem coupled to the second transceiver subsystem. The second processing subsystem is configured to communicate, to the controller node, the connection information identifying the first datapath node and the OAM information including the OAM action set that identifies the one or more OAM actions the first datapath node is capable of implementing at the first datapath node. The second processing subsystem is further configured to receive the first OAM tool module from the controller node for execution on the first datapath node that is operative to perform at least one of the one or more OAM actions identified in the OAM action set to implement the first OAM tool function. Among other advantages, the system facilitates the programming of a single node, in particular the controller node, with multiple different OAM tool modules, to reduce or eliminate a need to program multiple different datapath nodes.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
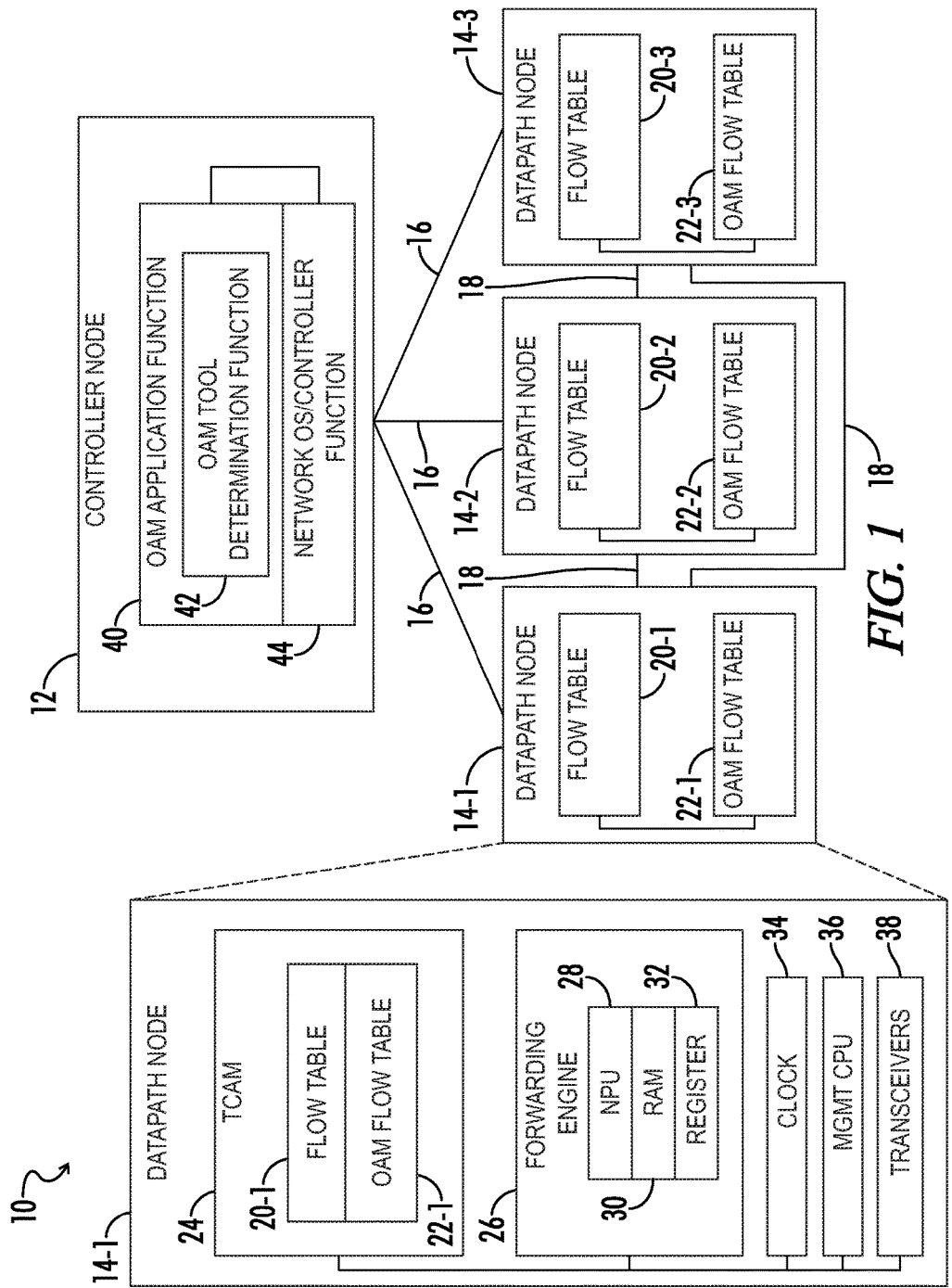
FIG. 1 is a block diagram of network in which Operations, Administration, and Management (OAM) functions may be implemented in a software defined network according to one embodiment.

FIG. 1 is a block diagram of a network 10 in which Operations, Administration, and Management (OAM) functions may be implemented in a software defined network according to one embodiment. Software defined networking (SDN) as used herein, refers to any network where forwarding plane functionality, sometimes referred to as data plane functionality, is implemented in a plurality of network nodes, referred to herein as datapath nodes, under the control of control plane functionality that is implemented in a separate network node, referred to herein as a controller node. An example of an SDN architecture, or specification, is the OpenFlow Switch Specification, version 1.1.0 (hereinafter "OpenFlow Switch Specification"), available from the OpenFlow Switch Consortium, and the contents of which are hereby incorporated herein by reference. However, the OpenFlow Switch Specification is but one example of an SDN architecture. The embodiments described herein are not limited to any particular type of SDN architecture, and indeed are applicable in any network architecture wherein forwarding plane functionality is separated from control plane functionality in different devices.

The phrase "OAM function" is used herein to refer to any function, or functions, that may be implemented in conjunction with a flow in a network for purposes of operations, administration, or management of the flow, or of the network in which the flow exists. Non-limiting examples of OAM functions include functions for proactive or on-demand fault management, such as continuity checks, loopbacks, and link traces; and functions for on-demand or proactive performance measurements, such as loss measurements, delay measurements, or throughput measurements. In the context of an Ethernet network, specific non-limiting examples of OAM functions include continuity checks for fault detection, loopback messages for fault verification, and multicast link trace messages for performing path discovery and fault isolations. Examples of Ethernet service performance measurement OAM functions include delay measurement and loss measurement. In the context of a Multiprotocol Label Switching (MPLS) network, non-limiting examples of OAM functions include label-switched path (LSP) ping functions for providing basic connectivity checks, which may be run periodically or on-demand, traceroute functionality, and loopback functionality. While specific example of OAM functions have been provided, the embodiments are not limited to the implementation of any particular OAM function, and may be used to implement any desired function with respect to the operations, administration, or management of a flow, or of a network in which the flow exists.

The use herein of ordinals, such as "first," "second," and "third" in conjunction with an element name, such as "datapath node," is solely for distinguishing what might otherwise be similar or identical element names, such as "first datapath node" and "second datapath node," and does not imply a priority, a hierarchy, an importance, nor does it contain any temporal or sequential meaning, unless otherwise stated herein.

The network 10 includes a controller node 12 and a plurality of datapath nodes 14-1-14-3 (generally, datapath nodes 14). While in practice the network 10 may comprise multiple controller nodes 12 and many, many datapath nodes 14, for purposes of illustration only one controller node 12 and three datapath nodes 14 are depicted. Each of the datapath nodes 14 is in communication with the controller node 12 via a communication link 16, and in communication with each other via communication links 18. The datapath nodes 14 may include respective flow tables 20-1-20-3 (generally, flow tables 20). A flow table 20 may maintain information about each flow handled by the respective datapath node 14. As used herein, the term "flow" refers to a path of data packets through the network 10 communicated between a source node (not illustrated) and a destination node (not illustrated). Each datapath node 14 may be associated with many flows, and typically processes such flows under the control of the controller node 12.

In one embodiment, each of the datapath nodes 14 also includes an OAM structure such as an OAM flow table 22-1-22-3 (generally, OAM flow tables 22), each of which stores information regarding OAM functionality implemented by the respective datapath node 14 in conjunction with a particular flow. Other elements of the datapath nodes 14, as shown in particular with respect to the datapath node 14-1, may include a ternary content-addressable memory (TCAM) 24 in which the flow table 20 and the OAM flow table 22 are implemented. In one embodiment, the datapath node 14-1 also includes a forwarding engine 26 for handling the forwarding of packets associated with flows in accordance with the flow table 20-1. The forwarding engine 26 includes one or more network processing units (NPUs) 28; a random access memory (RAM) 30, which may be used, for example, to store software instructions associated with an OAM tool module for implementing an OAM tool function in conjunction with a flow; and one or more registers 32. The datapath node 14-1 may also include a clock 34, which is used, for example, to generate timestamps associated with packets generated or processed by an OAM tool module. A management central processing unit (CPU) 36 may be used for overall control and management of the datapath node 14-1. The datapath node 14-1 may also include one or more transceivers 38 configured to communicate via, for example, the communication links 16, 18.

The controller node 12 may include an OAM application function 40 which implements the OAM functionality described herein with respect to the controller node 12. The OAM application function 40 may include, or be associated with, an OAM tool determination function 42, which, as described in greater detail herein, determines OAM tool modules for communication to respective datapath nodes 14. A network operating system (OS) and controller function 44 may be responsible for the overall functionality of the controller node 12, and communication with the datapath nodes 14.

Figure 2:
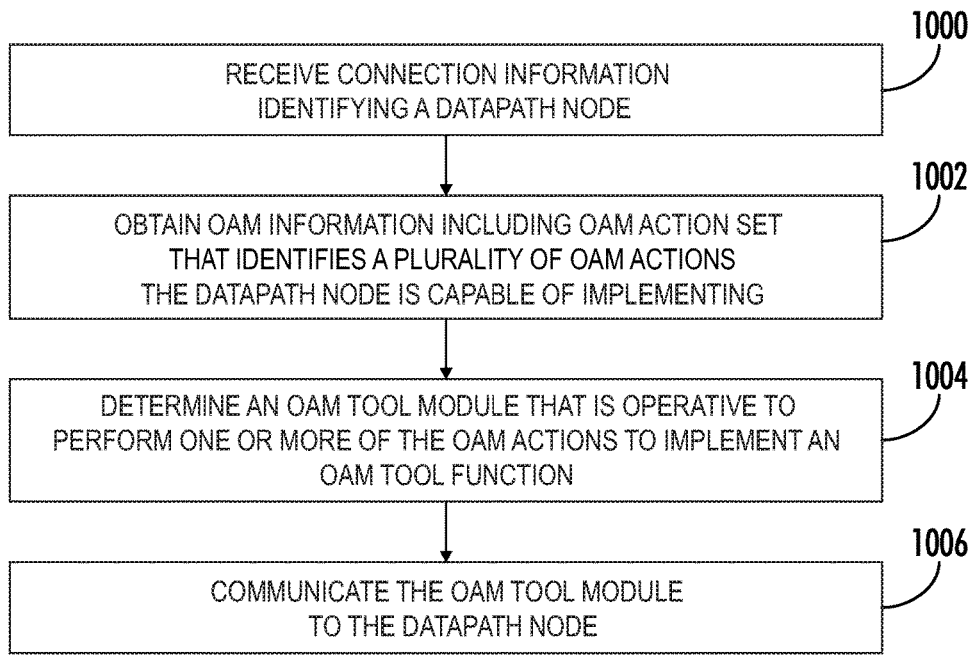
FIG. 2 is a flowchart illustrating a method for communicating an OAM tool module to a datapath node according to one embodiment.

Embodiments will now be discussed in greater detail with reference to FIG. 2, which illustrates a method for communicating an OAM tool module to a datapath node 14 according to one embodiment. FIG. 2 will be discussed in conjunction with FIG. 1. For purposes of illustration, assume that the datapath node 14-1 is in an initial connection phase which occurs as the datapath node 14-1 connects to the network 10. As part of the connection phase, the controller node 12 receives from the datapath node 14-1 connection information that identifies the datapath node 14-1 (FIG. 2, block 1000). In one embodiment, communications between the controller node 12 and the datapath nodes 14 utilize, or are otherwise in accordance with a particular SDN protocol, such as the OpenFlow protocol described in the OpenFlow Switch Specification. However, the embodiments are not limited to any particular communications protocol.

The controller node 12 also receives from the datapath node 14-1 OAM information that includes an OAM action set that identifies one or more OAM actions that the datapath node 14-1 is capable of implementing at the datapath node 14-1 (FIG. 2, block 1002). In one embodiment, the connection information comprises the OAM information. In another embodiment, the OAM information is sent separately from the connection information. An OAM action may comprise any action that may be useful in implementing an OAM function at the datapath node 14-1. Non-limiting examples of OAM actions include, for example, creating a packet; removing a packet from a dataplane of the datapath node 14-1; retrieving a value from a clock 34; retrieving a value from a register 32; incrementing a value in a packet; decrementing a value in a packet; comparing multiple values; setting a value in a specific field of a packet; initiating a timer; sending an alert; inserting a packet into the dataplane; swapping bytes in a header of a packet; and matching information in a header of a packet.

The controller node 12 determines an OAM tool module that is operative to perform at least one of the one or more OAM actions identified in the OAM action set to implement an OAM tool function at the datapath node 14-1 (FIG. 2, block 1004). Thus, the OAM tool module may comprise a series of OAM actions that collectively implement a particular OAM tool function, such as, for example, the generation of a packet at the datapath node 14-1 containing a predetermined layout and particular information. The OAM tool function may also send, transmit, or otherwise communicate the packet to another datapath node 14. As will be discussed in greater detail herein, different OAM tool functions may be performed at different datapath nodes 14 in conjunction with a flow to collectively implement an OAM function in conjunction with the flow.

The controller node 12 communicates the OAM tool module to the datapath node 14-1 (FIG. 2, block 1006). The controller node 12 may determine and communicate a plurality of different OAM tool modules to the datapath node 14-1 during the connection phase, or even subsequent to the connection phase, to facilitate a wide range of OAM tool functions which may be implemented by the datapath node 14-1 in conjunction with a flow.

Figure 3:
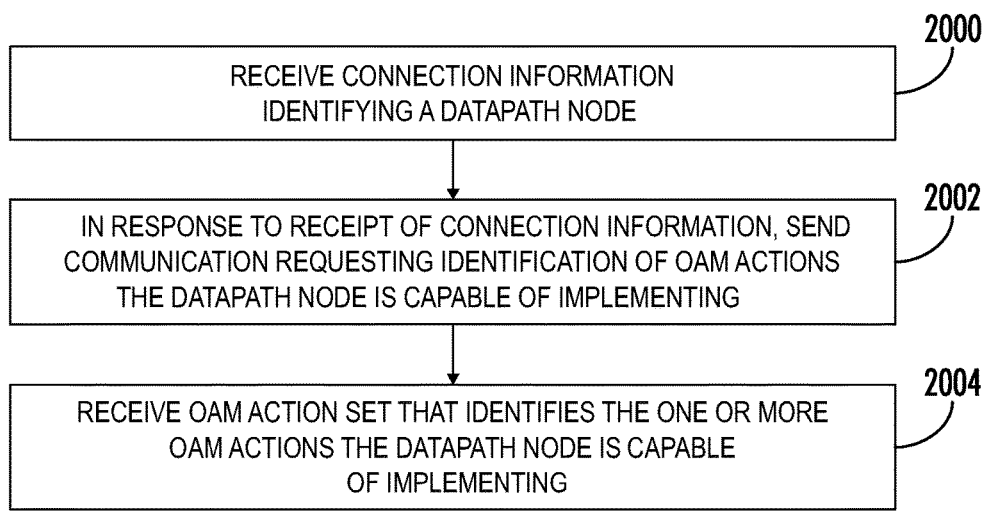
FIG. 3 is a flowchart of a process for communicating an OAM tool module to a datapath node according to another embodiment.

FIG. 3 is a flowchart of a process for communicating an OAM tool module to a datapath node 14 according to another embodiment. The process described with respect to FIG. 3 may occur in conjunction with the other steps described with regard to FIG. 2, and in particular relates to one embodiment for implementing blocks 1000-1002 of FIG. 2. Assume that the controller node 12 has received from the datapath node 14-1 the connection information that identifies the datapath node 14-1 (FIG. 3, block 2000). In this embodiment, the controller node 12, in response to the receipt of the connection information, sends a communication to the datapath node 14-1 that requests identification of the one or more OAM actions that the datapath node 14-1 is capable of implementing at the datapath node 14-1 (FIG. 3, block 2002). In response to the communication, the controller node 12 receives the OAM action set that identifies the one or more OAM actions that the datapath node 14-1 is capable of implementing at the datapath node 14-1 (FIG. 3, block 2004). Thus, in contrast to the embodiment discussed with respect to FIG. 2, in this embodiment, the datapath node 14-1 may not send the OAM action set until requested to do so by the controller node 12. Such request may come at some point in time substantially after the controller node 12 has received the connection information, or may come relatively soon after the controller node 12 has received the connection information.

Figure 4:
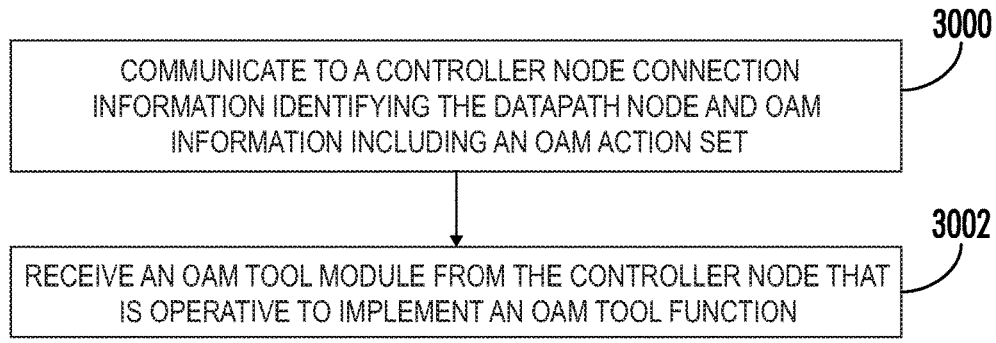
FIG. 4 is a flowchart illustrating a process for the datapath node to receive an OAM tool module from the controller node according to one embodiment.

FIG. 4 is a flowchart illustrating a process by which the datapath node 14-1 receives an OAM tool module from the controller node 12 according to one embodiment. As discussed above, during an initial connection phase, the datapath node 14-1 communicates connection information that identifies the datapath node 14-1 and OAM information that includes an OAM action set that identifies one or more OAM actions the datapath node 14-1 is capable of implementing at the datapath node 14-1 (FIG. 4, block 3000). The OAM information may be part of the connection information, or may be separate from the connection information. The datapath node 14-1 may automatically send the OAM information in conjunction with the connection information, or may send it only after receiving a communication from the controller node 12 requesting the OAM information. The datapath node 14-1 receives, from the controller node 12, an OAM tool module for execution on the datapath node 14-1 that is operative to perform at least one of the one or more OAM actions identified in the OAM action set to implement an OAM tool function (FIG. 4, block 3002).

Figure 5:
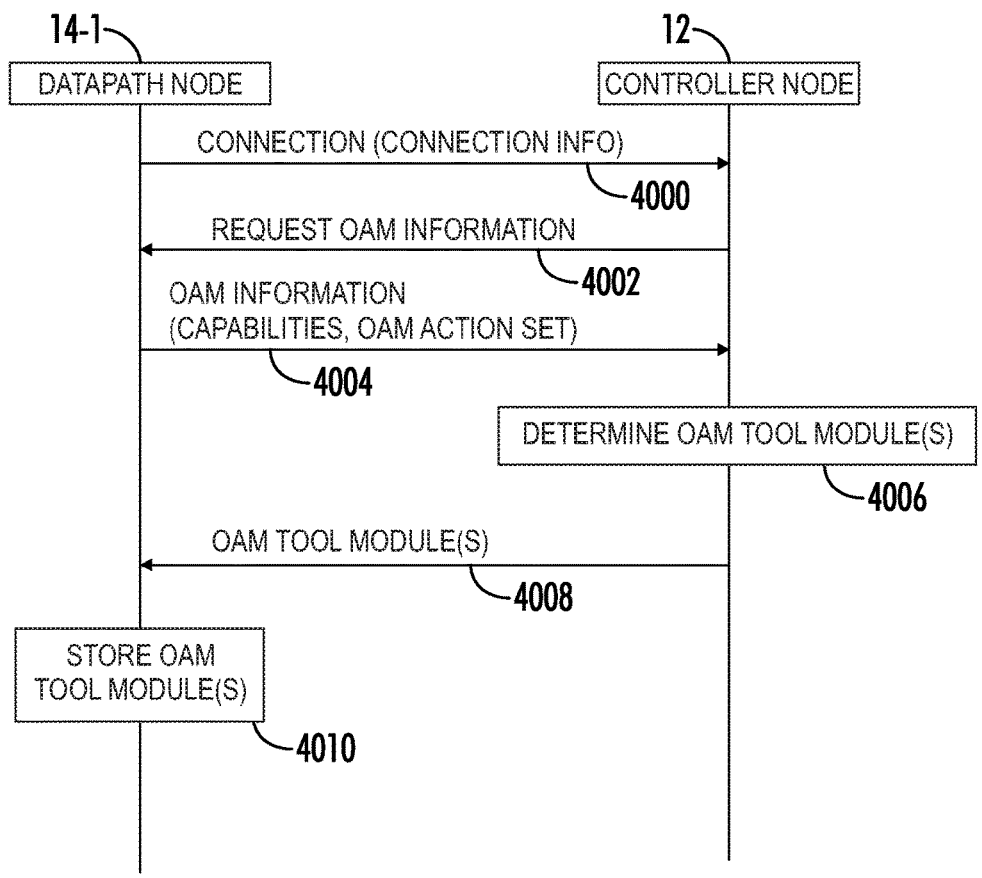
FIG. 5 is a message flow diagram illustrating exemplary messages between the controller node and the datapath node for communicating an OAM tool module to the datapath node.

FIG. 5 is a message flow diagram illustrating exemplary messages between the controller node 12 and the datapath node 14-1 for communicating an OAM tool module to the datapath node 14-1. Initially the datapath node 14-1 communicates connection information that identifies the datapath node 14-1 to the controller node 12 (FIG. 5, step 4000). In this embodiment, the controller node 12 sends the datapath node 14-1 a communication requesting OAM information from the datapath node 14-1, which may include not only the OAM action set, but other capabilities information regarding the datapath node 14-1 (FIG. 5, step 4002). Non-limiting examples of such capabilities information of a datapath node 14-1 include information about programmable processing units, such as information identifying one or more NPUs 28 (FIG. 1), field-programmable gate arrays (FPGAs), and management CPUs 36 (FIG. 1). In response, the datapath node 14-1 sends the OAM information identifying the capabilities of the datapath node 14-1, as well as the OAM action set, to the controller node 12 (FIG. 5, step 4004). Based on the OAM action set, the controller node 12 determines one or more OAM tool modules for communicating to the datapath node 14-1 (FIG. 5, step 4006). Mechanisms for determining OAM tool modules will be discussed in greater detail herein. The controller node 12 communicates the one or more OAM tool modules to the datapath node 14-1 (FIG. 5, step 4008). The datapath node 14-1 stores the one or more OAM tool modules at the datapath node 14-1 for subsequent implementation in conjunction with a flow under the control of the controller node 12 (FIG. 5, step 4010).

Figure 6:
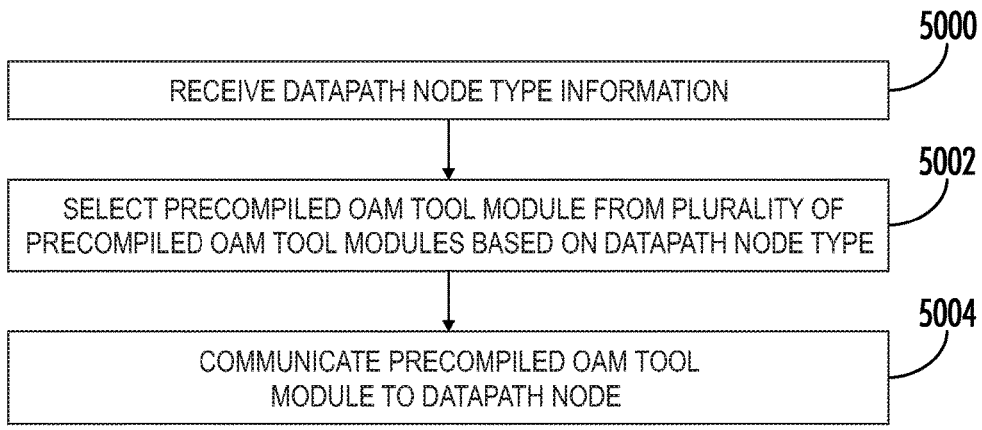
FIG. 6 is a flowchart illustrating a method for determining an OAM tool module according to one embodiment.

FIG. 6 is a flowchart illustrating a method for determining an OAM tool module according to one embodiment. The process described with respect to FIG. 6 may occur in conjunction with the other steps described with regard to FIG. 2, and in particular relates to one embodiment for implementing blocks 1004-1006 of FIG. 2. In this embodiment, the controller node 12 receives datapath node type information that identifies a datapath node type of the datapath node 14-1 (FIG. 6, block 5000). The datapath node type information may be included in the connection information (as discussed with regard to block 1000 of FIG. 2), or in the OAM information received from the datapath node 14-1 (as discussed with regard to block 1002 of FIG. 2). In this embodiment, the controller node 12 is in communication with a storage which comprises a plurality of precompiled OAM tool modules, each of the precompiled OAM tool modules corresponding to a particular type of datapath node 14-1. The precompiled OAM tool modules, for example, may each implement a particular OAM tool function on a datapath node 14-1 of the corresponding datapath node type. Based on the datapath node type of the datapath node 14-1, the controller node 12 selects one or more particular precompiled OAM tool modules (FIG. 6, block 5002). The controller node 12 communicates the one or more particular precompiled OAM tool modules to the datapath node 14-1 (FIG. 6, block 5004).

Figure 7:
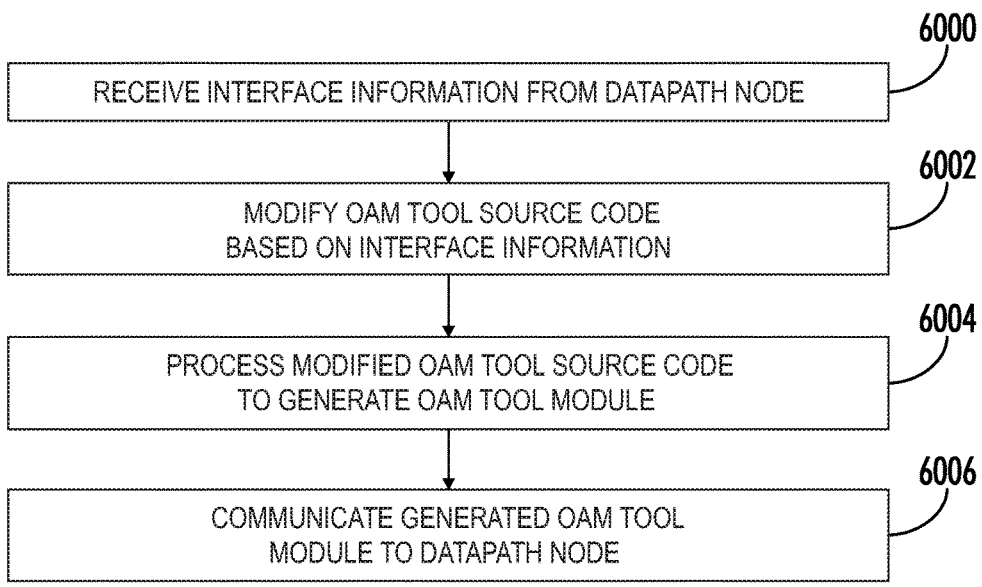
FIG. 7 is a flowchart illustrating a method for determining an OAM tool module according to another embodiment.

FIG. 7 is a flowchart illustrating a method for determining an OAM tool module according to another embodiment. The process described with respect to FIG. 7 may occur in conjunction with the other steps described with regard to FIG. 2, and in particular relates to another embodiment for implementing blocks 1004-1006 of FIG. 2. In this embodiment, the OAM information received by the controller node 12 from the datapath node 14-1 includes interface information that identifies interfaces, such as application programming interfaces or class interfaces, on the datapath node 14-1 to the one or more OAM actions identified in the OAM action set (FIG. 7, block 6000). The controller node 12 accesses an OAM tool source code and modifies the OAM tool source code based on the interface information (FIG. 7, block 6002). In one embodiment, the controller node 12 modifies the OAM tool source code by including at least portions of the interface information in the modified OAM tool source code. The controller node 12 processes the modified controller node 12 OAM tool source code to generate an OAM tool module for communication to the datapath node 14-1 (FIG. 7, block 6004). For example, the controller node 12 may initiate a compiler to compile the modified OAM tool source code and generate an executable version of the OAM tool module for execution on the datapath node 14-1. The controller node 12 communicates the generated OAM tool module to the datapath node 14-1 (FIG. 7, block 6006).

Figure 8:
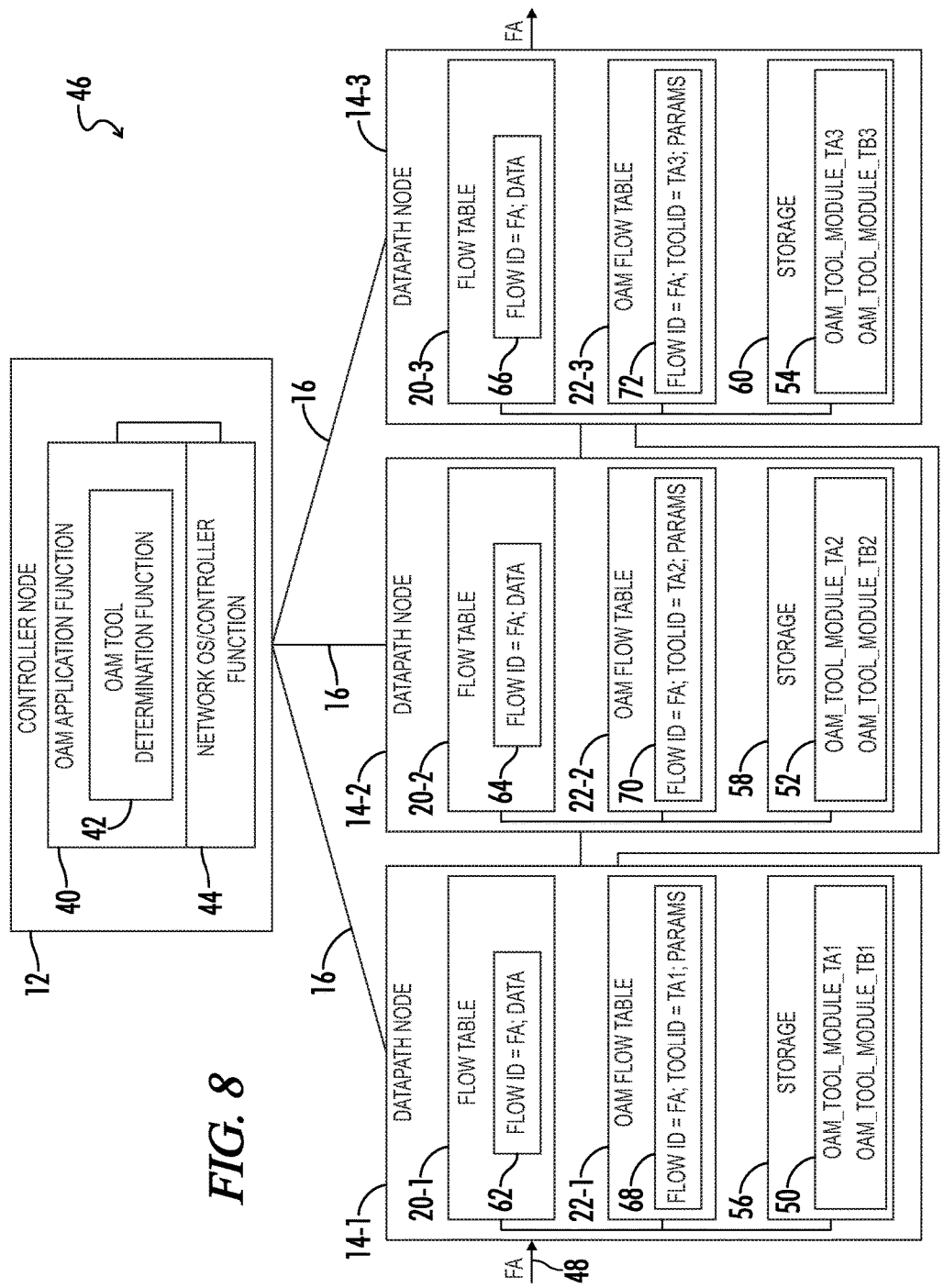
FIG. 8 is a block diagram of a network according to another embodiment.
Figure 9:
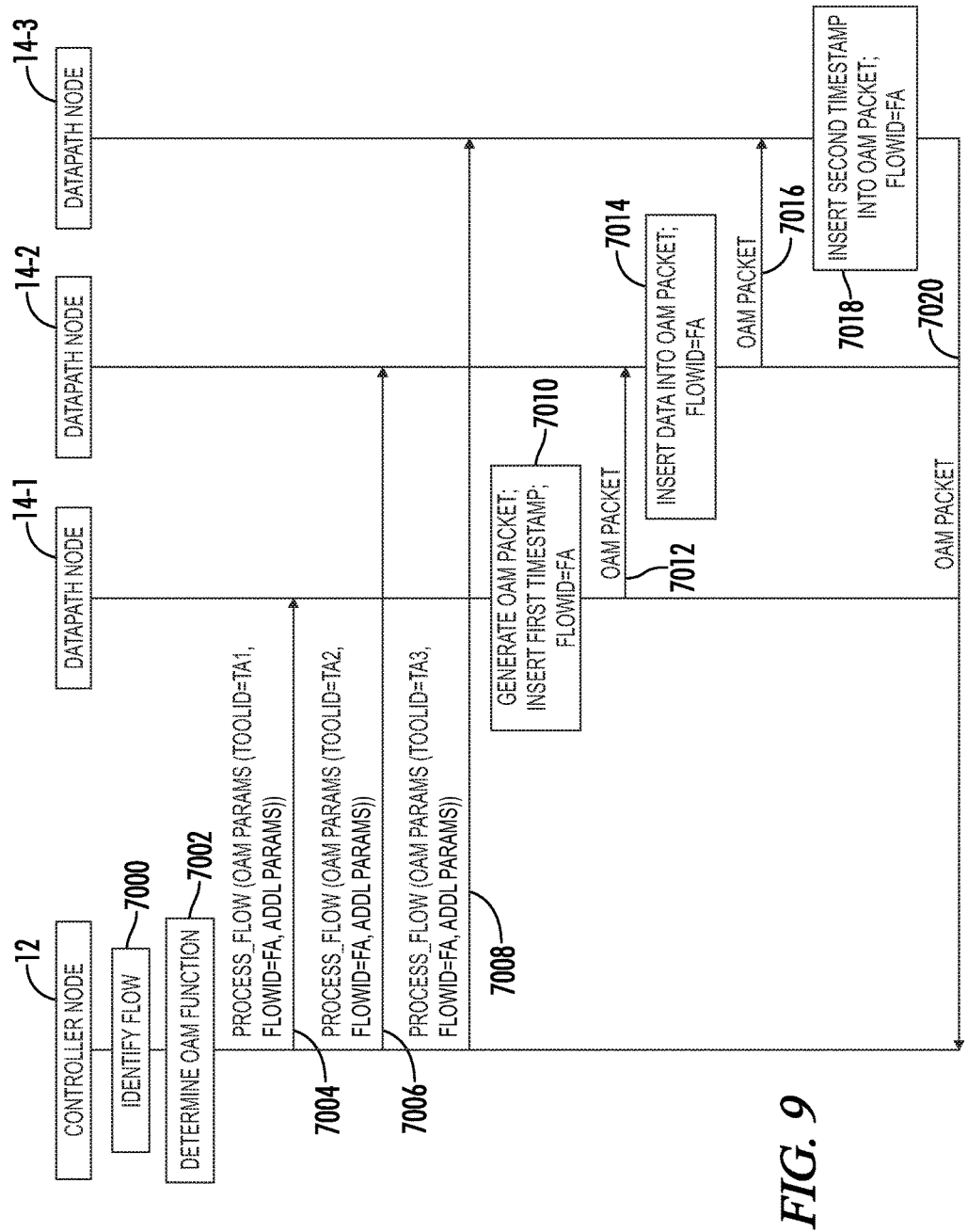
FIG. 9 is a message flow diagram illustrating example messages associated with implementing an OAM function on a flow according to one embodiment.

FIG. 8 is a block diagram of a network 46 according to another embodiment. FIG. 9 is a message flow diagram illustrating example messages associated with implementing an OAM function on a flow according to one embodiment. FIG. 9 will be discussed in conjunction with FIG. 8. Referring first to FIG. 9, the controller node 12 identifies a flow 48 ("FA") (FIG. 9, step 7000). The flow 48 may be identified by the controller node 12 in any desired manner, and for example may be identified as part of flow information provided in an initial flow setup request that the controller node 12 receives from a datapath node 14 to establish the new flow 48 in the network 46. Alternatively, the controller node 12 may identify the flow 48 via operator input that is received which identifies the flow 48 from a plurality of flows in the network 46. In one embodiment, the controller node 12 automatically identifies the flow 48 based on one or more attributes of the flow 48, such as an originating node or destination node of the flow 48, a priority of the flow 48, a type of data communicated in the flow 48, or the like.

The controller node 12 determines an OAM function to implement in conjunction with the flow 48 (FIG. 9, step 7002). The particular OAM function to implement may be determined in response to operator input or configuration parameters, based on an attribute of the flow 48, based on a performance metric associated with the network 46, or based on any other desired criterion or criteria. Generally, an OAM function is implemented via one or more OAM tool modules that each perform an OAM tool function at one or more datapath nodes 14 that are in the communications path of a flow 48. Thus, multiple OAM tool modules executing respective OAM tool functions at different datapath nodes 14 may collectively implement an OAM function in conjunction with a flow 48.

Assume that the controller node 12 determines that a particular OAM function should be implemented in conjunction with the flow 48. The particular OAM function is implemented via an OAM tool module 50 that executes in conjunction with the flow 48 at the datapath node 14-1, an OAM tool module 52 that executes in conjunction with the flow 48 at the datapath node 14-2, and an OAM tool module 54 that executes in conjunction with the flow 48 at the datapath node 14-3. For example, the OAM tool module 50 implements an OAM tool module function wherein a packet is created at an ingress datapath node 14, such as the datapath node 14-1, an initial timestamp is put into the newly created packet, and the packet is transmitted along the same communications path as the flow 48 to an intermediate datapath node 14, such as the datapath node 14-2. The OAM tool module 52 on the datapath node 14-2 implements an OAM tool module function wherein when the packet is received, the OAM tool module 52 inserts a second timestamp into the packet, and the OAM tool module 52 transmits the packet along the same communications path as the flow 48 to an egress datapath node 14, such as the datapath node 14-3. The OAM tool module 54 on the datapath node 14-3 implements an OAM tool module function wherein when the packet is received, the OAM tool module 54 inserts a third timestamp into the packet, and the OAM tool module 54 transmits the packet to the controller node 12, where the controller node 12 may examine the timestamps and make conclusions therefrom.

In one embodiment, the datapath node 14-1 already has the OAM tool module 50 stored in a storage 56, as part of an initial connection phase. In another embodiment, the controller node 12 may not communicate the OAM tool module 50 to the datapath node 14-1 until the controller node 12 determines that the OAM tool function that is implemented by the OAM tool module 50 is to be performed at the datapath node 14-1 in order to implement an OAM function on the flow 48. Thus, in such embodiment, the controller node 12 communicates the OAM tool module 50 to the datapath node 14-1 in response to identifying the flow 48, and determining to implement the OAM function on the flow 48. Similarly, the OAM tool module 52 may already be stored in a storage 58 of the datapath node 14-2, or may be communicated to the datapath node 14-2 upon the identification of the flow 48 and the determination to implement the OAM function on the flow 48. Similarly, the OAM tool module 54 may already be stored in a storage 60 of the datapath node 14-3, or may be communicated to the datapath node 14-3 upon the identification of the flow 48 and the determination to implement the OAM function on the flow 48.

Assume that each of the datapath nodes 14-1-14-3 is configured to handle the flow 48, typically under the control of the controller node 12. The datapath node 14-1 has a flow table entry 62 in the flow table 20-1 identifying the flow 48, and data regarding how the flow 48 should be handled; the datapath node 14-2 has a flow table entry 64 in the flow table 20-2 identifying the flow 48, and data regarding how the flow 48 should be handled; and the datapath node 14-3 has a flow table entry 66 in the flow table 20-3 identifying the flow 48, and data regarding how the flow 48 should be handled.

In order to implement the determined OAM function on the flow 48, the controller node 12 sends a communication that includes OAM parameters which direct the datapath node 14-1 to implement the OAM tool function associated with the OAM tool module 50 in conjunction with the flow 48 (FIG. 9, step 7004). In one embodiment, the OAM parameters may identify the flow 48; the OAM tool module 50 to implement in conjunction with the flow 48; and other appropriate information, such as information regarding a delay in running the OAM tool module 50, where to send the results of the OAM tool module 50; as well as parameters specific to the OAM tool module 50, such as one or more values to be set in an OAM packet (such as source and destination addresses, initial value for time to live (TTL) fields, tool identifier fields, and the like). The OAM parameters may also include an OAM packet template that defines a structure of an OAM packet to be created at the datapath node 14-1. In one embodiment, an OAM packet template could be represented by a type-length-value (TLV) sequence, for example.

The datapath node 14-1 receives the OAM parameters and generates an OAM flow table entry 68 that identifies the OAM tool module 50, the flow 48, and the additional parameters associated with implementing the desired OAM tool function on the flow 48.

The controller node 12 also sends a communication that includes OAM parameters which direct the datapath node 14-2 to implement the OAM tool function associated with the OAM tool module 52 in conjunction with the flow 48 (FIG. 9, step 7006). The datapath node 14-2 receives the OAM parameters and generates an OAM flow table entry 70 that identifies the OAM tool module 52, the flow 48, and the additional parameters associated with implementing the desired OAM tool function on the flow 48.

The controller node 12 further sends a communication that includes OAM parameters which direct the datapath node 14-3 to implement the OAM tool function associated with the OAM tool module 54 in conjunction with the flow 48 (FIG. 9, step 7008). The datapath node 14-3 receives the OAM parameters and generates an OAM flow table entry 72 that identifies the OAM tool module 54, the flow 48, and the additional parameters associated with implementing the desired OAM tool function on the flow 48.

Assume that the OAM tool function associated with the OAM tool module 50 comprises generating an OAM packet, inserting a first timestamp into the OAM packet, and forwarding the OAM packet to the datapath node 14-2. The datapath node 14-1, using an OAM packet template identified in the OAM parameters received from the controller node 12, generates a new OAM packet, generates a timestamp identifying a current time, and inserts the timestamp at an identified location in the OAM packet (FIG. 9, step 7010). The datapath node 14-1 then communicates the OAM packet toward the datapath node 14-2 (FIG. 9, step 7012). The NPUs 28 (FIG. 1) and/or management CPU 36 (FIG. 1) may facilitate the execution of the OAM tool module 50.

Assume that the OAM tool function associated with the OAM tool module 52 comprises receiving the OAM packet generated by the datapath node 14-1, inserting additional data into one more identified fields in the OAM packet, and forwarding the OAM packet to the datapath node 14-3. The datapath node 14-2 receives the OAM packet generated by the datapath node 14-1, generates or obtains the identified additional data, and inserts such data into particular fields in the OAM packet (FIG. 9, step 7014). The datapath node 14-2 communicates the modified OAM packet toward the datapath node 14-3 (FIG. 9, step 7016).

Assume that the OAM tool function associated with the OAM tool module 54 comprises receiving the OAM packet generated by the datapath node 14-1, inserting a second timestamp into an identified field of the OAM packet, and communicating the OAM packet to the controller node 12. The datapath node 14-3 receives the OAM packet generated by the datapath node 14-1 and modified by the datapath node 14-2, generates a second timestamp identifying a current time, and inserts the second timestamp at an identified location in the OAM packet (FIG. 9, step 7018). The datapath node 14-3 communicates the modified OAM packet to the controller node 12 (FIG. 9, step 7020).

While for purposes of illustration the OAM flow tables 22 are depicted as having a single flow table entry, it should be apparent that each OAM flow table 22 may have a plurality of flow table entries, each flow table entry identifying a particular flow, and an OAM tool module for implementing an OAM tool function in conjunction with the flow.

While for purposes of illustration a relatively simple OAM function was described as being collectively implemented by the OAM tool modules 50-54, the embodiments are not limited to any particular OAM functionality, and can be used to implement any desired OAM function in the network 46.

Figure 10:
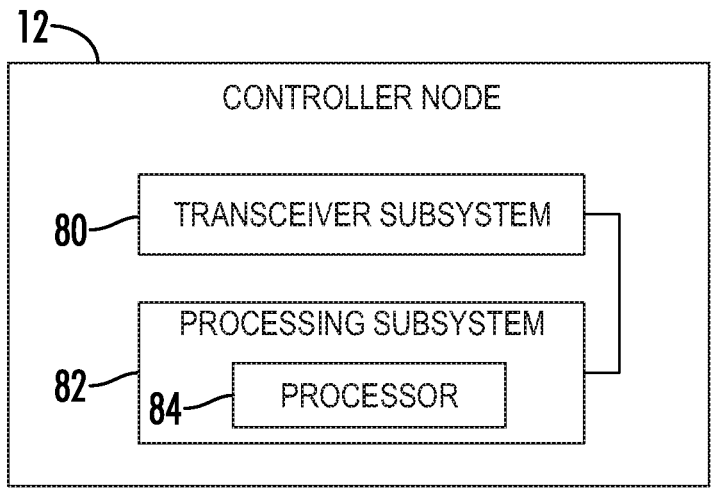
FIG. 10 is a block diagram of the controller node according to one embodiment.

Additional, non-limiting examples of OAM functions include a one-way delay measurement OAM function for MPLS-TP using Internet Engineering Task Force (IETF) RFC6374 and the interpretation of the Y.1731 standard from draft-bhh-mpls-tp-oam-y1731-08. In this example, an OAM tool module could be implemented on the ingress datapath node 14-1 that implements the following OAM tool function:

1) create empty packet (packet template)
2) set fields for MPLS header: LSP label stack, Generic Associated Channel Label (GAL), Generic Associated Channel (G-ACH) (see IETF RFC5586 and IETF RFC6374 (available from IETF Secretariat, c/o Association Management Solutions, LLC (AMS), 48377 Fremont Blvd., Suite 117, Fremont, Calif. 94538), the contents of all IETF RFCs mentioned herein are hereby incorporated herein in their entirety). Certain parameters for the header, such as GAL label value, TC and S fields, Channel Type=MPLS Delay Measurement, Version, Opcode, Flags, Timestamp formats, and the like, may have values that are constant and predetermined. Others, such as the TTL field, may be calculated on a packet-by-packet basis depending on the desired functionality. Assume for purposes of illustration that setting the MPLS header is performed as a sequence of bit-setting operations. Each of these operations receives as parameters the length of the bit field to be set and the value to be set. This information may be provided in the OAM parameters received from the controller node 12
3) retrieve value from clock
4) set timestamp
5) insert packet in dataplane
6) when receiving a response, set arrival timestamp
7) check control code for errors. If no error, continue
8) operate on timestamps according to the message type (in-band, out-of-band)
9) update counter according to the results An intermediary datapath node, such as the datapath node 14-2, may execute an OAM tool module that implements the following OAM tool function:

1) identify flow based on N-tuple configuration
2) decrement TTL value
3) forward packet to egress datapath node An egress datapath node, such as the datapath node 14-3, may execute an OAM tool module that implements the following OAM tool function:
1) set arrival timestamp
2) extract DM message
3) inspect DM Query field. If a response is not required, drop packet silently (and possibly increase a counter). If a response is required, continue
4) create empty packet having a particular size
5) if the response is in-band, set fields for MPLS header so that packet is addressed to the ingress datapath node. The required information already exists in the packet
6) if the response is out-of-band, set header fields according to pre-configured template
7) set departure timestamp
8) insert packet on the data path Another example of an OAM function comprises a Y.1731 one-way delay. The ingress datapath node, such as the datapath node 14-1, may execute an OAM tool module that implements the following OAM tool function:
1) create empty packet having a particular size
2) set fields for MPLS header: LSP label stack, GAL, G-ACH (see IETF RFC5586 and draft-bhh-mpls-tp-oam-y1731-08 in the Annex, the contents of which are hereby incorporated herein in their entirety). Some parameters for such headers, such as the GAL label value, TC and S fields, Channel Type, Version, Opcode, and Flags, may have values that are constant and predetermined. Others, such as the TTL field, may be calculated on a packet-by-packet basis depending on the desired functionality. Assume that setting of the MPLS header is performed as a sequence of bit-setting operations. Each of these operations receives as parameters the length of the bit field to be set and the value to be set
3) set 1 DM header
4) set 1 DM timestamp in IEEE 1588 PTP format
5) insert packet in dataplane An intermediary datapath node, such as the datapath node 14-2, may execute an OAM tool module that implements the following OAM tool function:
1) identify flow based on N-tuple configuration
2) decrement TTL value
3) forward packet to egress node An egress datapath node, such as the datapath node 14-3, may execute an OAM tool module that implements the following OAM tool function:
1) set arrival timestamp
2) extract 1 DM message
3) calculate the difference between the timestamps
4) update counter according to the results FIG. 10 is a block diagram of the controller node 12 according to one embodiment. In addition to elements discussed previously, the controller node 12, includes, for example, a transceiver subsystem 80 and a processing subsystem 82. The transceiver subsystem 80 generally includes components for sending and receiving communications to and from other nodes, such as the datapath nodes 14. From a communications protocol view, the transceiver subsystem 80 may implement at least part of Layer 1 (i.e., the Physical or "PHY" Layer). The processing subsystem 82 generally implements other remaining portions of Layer 1, as well as functions for higher layers in communications protocols (e.g., Layer 2 (data link layer), Layer 3 (network layer), etc.). Of course, the detailed operation for each of the functional protocol layers, and thus the transceiver subsystem 80 and the processing subsystem 82, will vary depending on both the particular implementation as well as the standard or standards supported by the controller node 12.

Those skilled in the art will appreciate that the block diagram of the controller node 12 necessarily omits numerous features that are not necessary to a complete understanding of this disclosure. Although all of the details of the processing subsystem 82 are not illustrated, the processing subsystem 82 comprises one or several general-purpose or special-purpose processors 84 or other microcontrollers programmed with suitable software programming instructions and/or firmware to carry out some or all of the functionality of the network nodes described herein. In addition, or alternatively, the processing subsystem 82 comprise various digital hardware blocks (e.g., one or more Application Specific Integrated Circuits (ASICs), one or more off-the-shelf digital or analog hardware components, or a combination thereof) configured to carry out some or all of the functionality of the network nodes described herein. The controller node 12 may also include one or more storage media for storing data necessary and/or suitable for implementing the functionality described herein, as well as for storing complex programming instructions which, when executed on the processor 84, may implement all or part of the functionality described herein. One embodiment of the present disclosure may be implemented as a computer program product that is stored on a computer-readable storage medium, the computer program product including complex programming instructions that are configured to cause a processor, such as the processor 84, to carry out the steps described herein.

Figure 11:
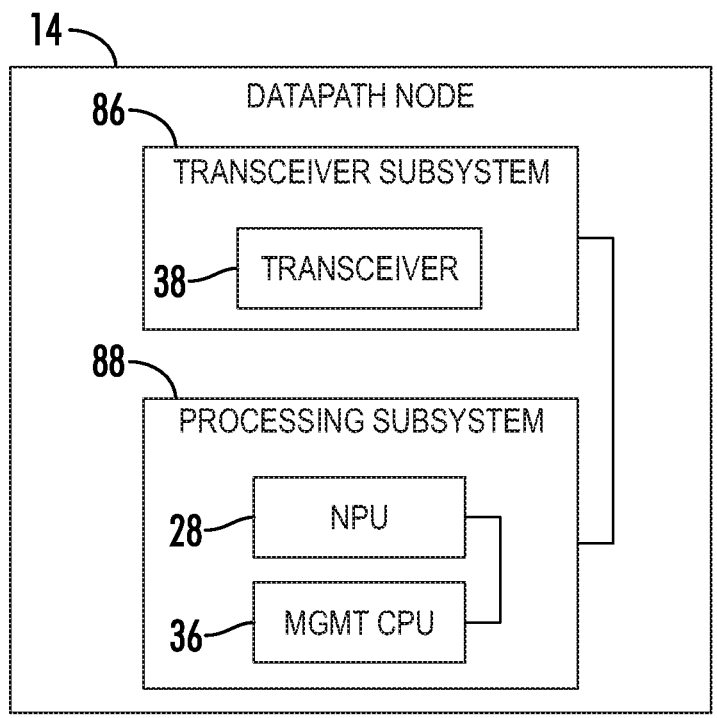
FIG. 11 is a block diagram of a datapath node according to one embodiment.

FIG. 11 is a block diagram of a datapath node 14 according to one embodiment. In addition to elements discussed previously, the datapath node 14 may, for example, include a transceiver subsystem 86 that includes the transceivers 38, and a processing subsystem 88. The transceiver subsystem 86 generally includes components for sending and receiving communications to and from other nodes, such as the datapath nodes 14 and the controller node 12. From a communications protocol view, the transceiver subsystem 86 may implement at least part of Layer 1 (i.e., the Physical or "PHY" Layer). The processing subsystem 88 generally implements other remaining portions of Layer 1, as well as functions for higher layers in communications protocols (e.g., Layer 2 (data link layer), Layer 3 (network layer), etc.). Of course, the detailed operation for each of the functional protocol layers, and thus the transceiver subsystem 86 and the processing subsystem 86, will vary depending on both the particular implementation as well as the standard or standards supported by the datapath node 14.

Those skilled in the art will appreciate that the block diagram of the datapath node 14 necessarily omits numerous features that are not necessary to a complete understanding of this disclosure. Although all of the details of the processing subsystem 88 are not illustrated, the processing subsystem 88 comprises one or several general-purpose or special-purpose processors, such as, for example, the management CPU 36 and NPU 28, or other microcontrollers programmed with suitable software programming instructions and/or firmware to carry out some or all of the functionality of the network nodes described herein. In addition, or alternatively, the processing subsystem 88 comprise various digital hardware blocks (e.g., one or more Application Specific Integrated Circuits (ASICs), one or more off-the-shelf digital or analog hardware components, or a combination thereof) configured to carry out some or all of the functionality of the network nodes described herein. The datapath node 14 may also include one or more storage media for storing data necessary and/or suitable for implementing the functionality described herein, as well as for storing complex programming instructions which, when executed on the management CPU 36 or the NPU 28, may implement all or part of the functionality described herein. One embodiment of the present disclosure may be implemented as a computer program product that is stored on a computer-readable storage medium, the computer program product including complex programming instructions that are configured to cause a processor, such as the management CPU 36 or NPU 28, to carry out the steps described herein.

The following acronyms are used throughout this disclosure:

| | |
|---|---|
| ASIC | Application Specific Integrated Circuit |
| CPU | central processing unit |
| FPGA | field-programmable gate array |
| G-ACH | Generic Associated Channel |
| GAL | Generic Associated Channel Label |
| LSP | label-switched path |
| MPLS | Multiprotocol Label Switching |
| NPU | network processing units |
| OAM | Operations, Administration, and Management |
| OS | operating system |
| RAM | random access memory |
| SDN | software defined networking |
| TCAM | ternary content-addressable memory |
| TLV | type-length-value |
| TTL | time to live |

Those skilled in the art will recognize improvements and modifications to the preferred embodiments of the present disclosure. All such improvements and modifications are considered within the scope of the concepts disclosed herein and the claims that follow.

What is claimed is:

1. A method for obtaining an operations, administration, and management (OAM) tool module, comprising:
   communicating, by a datapath node to a controller node, connection information that identifies the datapath node and OAM information including an OAM action set that identifies one or more OAM actions the datapath node is capable of implementing at the datapath node; and
   receiving an OAM tool module from the controller node for execution on the datapath node that is operative to perform at least one of the one or more OAM actions identified in the OAM action set to implement a first OAM tool function.

2. The method of claim 1, wherein the OAM tool module is received from the controller node in response to sending the connection information that identifies the datapath node and the OAM information.

3. The method of claim 1, further comprising:
   sending, to the controller node, flow information that identifies a flow, wherein the OAM tool module is received from the controller node in response to sending the flow information.

4. The method of claim 1, further comprising:
   receiving a direction from the controller node to implement the first OAM tool function in conjunction with an identified flow.

5. The method of claim 4, wherein receiving the direction from the controller node to implement the first OAM tool function in conjunction with the identified flow further comprises receiving OAM parameters from the controller node, the OAM parameters identifying the OAM tool module and the identified flow.

6. The method of claim 5, further comprising:
   generating an OAM flow table at the datapath node; and
   generating a first OAM flow table entry based on the OAM parameters.

7. The method of claim 6, wherein the OAM flow table comprises a plurality of OAM flow table entries including the first OAM flow table entry, wherein each OAM flow table entry identifies a particular flow, and an OAM tool module for implementing an OAM tool function in conjunction with the respective flow.

8. The method of claim 5, wherein the OAM parameters further identify an OAM packet template that defines a structure of a packet to be created by the datapath node.

9. The method of claim 8, wherein the OAM parameters further identify a value to be inserted into the packet.

10. The method of claim 5, wherein the OAM parameters further identify a node to which information should be sent by the OAM tool module.

11. The method of claim 1, further comprising communicating the OAM information including the OAM action set that identifies the one or more OAM actions the datapath node is capable of implementing at the datapath node in response to receiving, from the controller node, a communication requesting an identification of one or more OAM actions the datapath node is capable of implementing.

12. The method of claim 1, wherein the OAM information further includes interface information that identifies interfaces on the datapath node to the one or more OAM actions identified in the OAM action set.

13. A datapath node, comprising:
   a transceiver subsystem configured to communicate with a network; and
   a processing subsystem coupled to the transceiver subsystem and configured to:
      communicate, to a controller node, connection information identifying the datapath node and operations, administration, and management (OAM) information including an OAM action set that identifies one or more OAM actions the datapath node is capable of implementing at the datapath node; and
      receive an OAM tool module from the controller node for execution on the datapath node that is operative to perform at least one of the one or more OAM actions identified in the OAM action set to implement a first OAM tool function.

14. The datapath node of claim 13 wherein the processing subsystem is further configured to send, to the controller node, flow information that identifies a flow, wherein the OAM tool module is received from the controller node in response to sending the flow information.

15. The datapath node of claim 13 wherein the processing subsystem is further configured to receive a direction from the controller node to implement the first OAM tool function in conjunction with an identified flow.

16. The datapath node of claim 15 wherein to receive the direction from the controller node to implement the first OAM tool function in conjunction with the identified flow, the processing subsystem is further configured to receive OAM parameters from the controller node, the OAM parameters identifying the OAM tool module and the identified flow.

17. The datapath node of claim 16 wherein the processing subsystem is further configured to:
   generate an OAM flow table at the datapath node; and
   generate a first OAM flow table entry based on the OAM parameters.

18. The datapath node of claim 17 wherein the OAM flow table comprises a plurality of OAM flow table entries including the first OAM flow table entry, wherein each OAM flow table entry identifies a particular flow, and an OAM tool module for implementing an OAM tool function in conjunction with the respective flow.

19. The datapath node of claim 16, wherein the OAM parameters further identify an OAM packet template that defines a structure of a packet to be created by the datapath node.

20. The datapath node of claim 14 wherein the processing subsystem is further configured to communicate the OAM information including the OAM action set that identifies the one or more OAM actions the datapath node is capable of implementing at the datapath node in response to receiving, from the controller node, a communication requesting an identification of one or more OAM actions the datapath node is capable of implementing.

21. A method for obtaining an operations, administration, and management (OAM) tool module, comprising:
   communicating, by a datapath node to a controller node, connection information that identifies the datapath node and OAM information including an OAM action set that identifies one or more OAM actions the datapath node is capable of implementing at the datapath node;
   receiving an OAM tool module from the controller node for execution on the datapath node that is operative to perform at least one of the one or more OAM actions identified in the OAM action set to implement a first OAM tool function; and
   executing, by the datapath node, the OAM tool module.

* * * * *